(12) United States Patent
Lai et al.

(10) Patent No.: US 10,331,262 B2
(45) Date of Patent: Jun. 25, 2019

(54) DRIVING UNIT, DRIVING METHOD, DRIVING CIRCUIT, AND DISPLAY PANEL

(71) Applicants: Xiamen Tianma Micro-Electronics Co., Ltd, Xiamen (CN); Tianma Micro-Electronics Co., Ltd., Shenzhen (CN)

(72) Inventors: Qingjun Lai, Xiamen (CN); Zhaokeng Cao, Xiamen (CN); Poping Shen, Xiamen (CN); Xiufeng Zhou, Xiamen (CN); Yihua Zhu, Xiamen (CN); Zhaodong Zhang, Xiamen (CN)

(73) Assignees: Xiamen Tianma Micro-Electronics Co., Ltd, Xiamen (CN); Tianma Micro-Electronics Co., Ltd., Shenzhen (CN)

( * ) Notice: Subject to any disclaimer, the term of this patent is extended or adjusted under 35 U.S.C. 154(b) by 252 days.

(21) Appl. No.: 15/359,515

(22) Filed: Nov. 22, 2016

(65) Prior Publication Data

US 2017/0075488 A1 Mar. 16, 2017

(30) Foreign Application Priority Data

Jul. 29, 2016 (CN) .......................... 2016 1 0616835

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01)

(58) Field of Classification Search
CPC ....... G06F 3/0416; G06F 3/044; G06F 3/0412
See application file for complete search history.

(56) References Cited

U.S. PATENT DOCUMENTS

| | | | | |
|---|---|---|---|---|
| 2016/0132170 A1* | 5/2016 | Zhang | .................... | G06F 3/0416 345/173 |
| 2016/0188049 A1* | 6/2016 | Yang | ........................ | G06F 3/044 345/174 |
| 2016/0188087 A1* | 6/2016 | Sun | .......................... | G06F 3/044 345/173 |
| 2016/0188091 A1* | 6/2016 | Sun | .......................... | G06F 3/044 345/174 |

* cited by examiner

*Primary Examiner* — Viet D Pham
(74) *Attorney, Agent, or Firm* — Kilpatrick Townsend & Stockton LLP

(57) ABSTRACT

A driving unit, a driving method, a driving circuit, and a display panel are disclosed. The driving unit is for providing a signal to a touch electrode of an array substrate, comprising: a first control signal input terminal, a second control signal input terminal, a gating signal input terminal, a touch control driving module, a display driving module, and a signal output terminal. The touch control driving module is configured to output a touch control signal to the signal output terminal, and is controlled by a signal inputted through the first control signal input terminal, a signal inputted through the second control signal input terminal, and a signal inputted through the gating signal input terminal. The display driving module is configured to output a common voltage signal to the signal output terminal, and is controlled by the signal inputted through the gating signal input terminal.

17 Claims, 8 Drawing Sheets

DRIVING UNIT, DRIVING METHOD, DRIVING CIRCUIT, AND DISPLAY PANEL

CROSS-REFERENCES TO RELATED APPLICATIONS

This application claims the benefit of Chinese Patent Application No. 201610616835.9, filed on Jul. 29, 2016, the disclosure of which is incorporated herein in its entirety by reference.

TECHNICAL FIELD

The present disclosure relates to the field of display technology, and specifically relates to a driving unit, a driving method, a driving circuit, and a display panel.

BACKGROUND

Touch display screens are categorized into a self-capacitive touch display screen and a mutual-capacitive touch display screen dependent upon their touch principles. Typically in the existing mutual-capacitive touch display screen, mutual capacitors are formed between touch reference electrodes and touch sensing electrodes, and a touch point is detected by measuring variations of the amounts of charges in the mutual capacitors while the touch display screen is being touched. In the driving architecture of the mutual-capacitive touch display screen described above, a shifting circuit needs to be designed to provide the touch reference electrodes with a touch detection signal. Here the shifting module includes a plurality of levels of shifting units, where each level of shifting unit corresponds to one of the touch reference electrodes, and each level of shifting unit shifts a signal outputted by a preceding level of shifting unit and then outputs a shifted signal. Within the width of a signal pulse outputted by the shift unit, the corresponding touch reference electrode receives the touch detection signal.

The above driving architecture needs a complex shift circuit to successively drive touch electrodes. The shift circuit is usually designed independent of the driving circuit, generally provided on a display panel, and has a relatively complex structure, it needs to occupy a larger panel space. Moreover, the shift circuit can only scan the touch electrodes in a specified sequence, the sequence of scanning the touch electrodes can therefore hardly be changed, resulting in a relatively poor flexibility in controlling.

SUMMARY OF THE INVENTION

In view of the above, it is desired to provide a touch display screen that may simplify a panel circuit design. Further, it is also desired to provide a driving circuit with a high control flexibility. In order to solve the technical problems above, the present disclosure provides a driving unit, a driving method, a driving circuit, and a display panel.

In a first aspect, the present disclosure provides a driving unit for providing a signal to a touch electrode of an array substrate. The driving unit comprise: a first control signal input terminal, a second control signal input terminal, a gating signal input terminal, a touch control driving module, a display driving module, and a signal output terminal. The touch control driving module is configured to output a touch control signal to the signal output terminal, and is controlled by a signal inputted through the first control signal input terminal, a signal inputted through the second control signal input terminal, and a signal inputted through the gating signal input terminal. The display driving module is configured to output a common voltage signal to the signal output terminal, and is controlled by the signal inputted through the gating signal input terminal.

In a second aspect, the present disclosure provides a driving method for driving the above driving unit. The method comprises: during a display phase, providing a first level signal to the first control signal input terminal and the gating signal input terminal, and outputting the common voltage signal by the driving unit. During a touch detection phase, providing a first pulse signal to the first control signal input terminal, providing a second level signal to the gating signal input terminal, and outputting a periodic touch control signal by the driving unit. A voltage value of the first level signal is different from that of the second level signal.

In a third aspect, the present disclosure provides a driving circuit applied to an array substrate. The array substrate comprises N touch electrodes, the driving circuit comprising N driving units as provided in the first aspect of the present disclosure, and a first touch control signal input terminal. The signal output terminals of the driving units are connected to the touch electrodes in one-to-one correspondence. The first control signal input terminal of each of the driving units is connected to the first touch control signal input terminal.

In a fourth aspect, the present disclosure provides a display panel, comprising an array substrate, wherein the array substrate comprises N touch electrodes, a driving IC, and the above driving circuit. The signal output terminals of respective driving units in the driving circuit are connected to the touch electrodes in one-to-one correspondence. The driving IC is connected to the driving circuit, and is configured to: during each display phase, provide a first level signal to the first touch control signal input terminal and the gating signal input terminal. During each touch detecting phase, provide a first pulse signal to the first touch control signal input terminal, and during each touch detecting phase, provide a second level signal to the gating signal input terminal of the driving unit.

The driving unit, driving method, driving circuit and display panel provided according to the present disclosure spare designing of a shift circuit, and a gating control signal in the driving unit may be directly provided by the driving IC, i.e., the gating control function is integrated into the driving IC to thereby simplify the driving circuit of the touch electrode, reduce a panel space occupied by the driving circuit, and improve the control flexibility.

BRIEF DESCRIPTION OF THE ACCOMPANYING DRAWINGS

Other features, objectives and advantages of the present disclosure will become more apparent through reading detailed depiction of the non-limitative embodiments made with reference to the following accompanying drawings.

DETAILED DESCRIPTION OF THE PREFERRED EMBODIMENTS

The present disclosure will be described in further detail with reference to the accompanying drawings and embodiments. It may be understood that the embodiments as described here are only used for explaining relevant inventions, rather than limiting the inventions. It should also be noted that for ease of description, the drawings only illustrate portions related to the present invention.

It should be noted that without conflicts, the embodiments in the present disclosure and the features in the embodiments may be combined with each other. Hereinafter, the present disclosure will be described in detail with reference to the accompanying drawings in conjunction with the embodiments.

Figure 1:
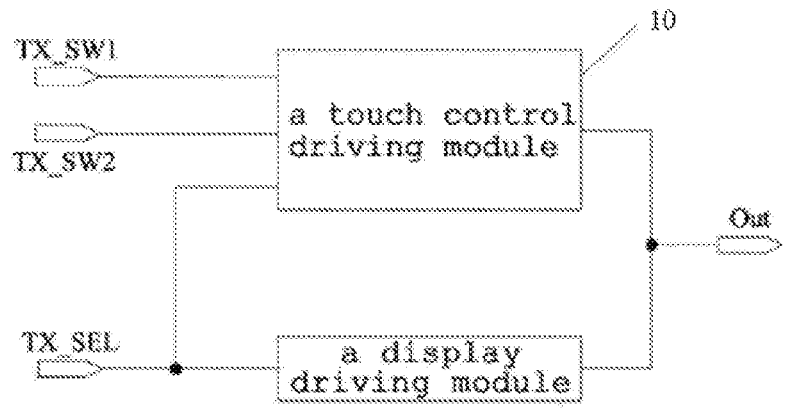
FIG. 1 illustrates an overall structural diagram of one embodiment of a driving unit of the present invention.

FIG. 1 illustrates an overall structural diagram of one embodiment of a driving unit of the present invention. The driving unit of the present invention is provided on an array substrate which comprises touch electrodes. The unit is for providing signals to the touch electrodes.

As illustrated in FIG. 1, the driving unit 100 comprises a first control signal input terminal TX_SW1, a second control signal input terminal TX_SW2, a gating signal input terminal TX_SEL, a touch control driving module 10, a display driving module 20, and a signal output terminal Out.

The touch control driving module 10 comprises three input terminals and one output terminal, wherein three input terminals of the touch control driving module 10 are connected to the first control signal input terminal TX_SW1, the second control signal input terminal TX_SW2, and the gating signal input terminal TX_SEL, respectively, and the output terminal of the touch control driving module 10 is connected to the signal output terminal Out.

The touch control driving module 10 is for outputting a touch control signal to the signal output terminal Out under control of the signal inputted by the first control signal input terminal TX_SW1, the signal inputted by the second control signal input terminal TX_SW2, and the signal inputted by the gating signal input terminal TX_SEL.

The display driving module 20 comprises an input terminal and an output terminal, wherein one input terminal of the display driving module 10 is connected to the gating signal input terminal TX_SEL, and the output terminal of the display driving module 10 is connected to the signal output terminal Out.

The display driving module 20 is for outputting a common voltage signal to the signal output terminal Out under control of the signal inputted by the gating signal input terminal TX_SEL.

The signal output terminal Out may be connected to the touch electrode on the array substrate. The touch control driving module 10 and the display driving module 20 are enabled at a touch detecting phase and a displaying phase, respectively, i.e., the touch control driving module 10 and the display driving module 20 are in a working state at the touch detecting phase and the displaying phase, respectively. In other words, during the touch detecting phase, the touch control driving module 10 drives the touch electrodes, and the display driving module 20 does not drive the touch electrodes. During the display phase, the display driving module 20 drives the touch electrode, and the touch control driving module 10 does not drive the touch electrodes. At the display phase, the display driving module 20 is enabled under control of the signal inputted by the gating signal input terminal TX_SEL, and the signal output terminal Out outputs a common voltage signal to the touch electrode. At this point, the touch electrode is a common electrode to provide the array substrate with the common voltage signal needed for display. During the touch detecting phase, the touch control driving module 10 is enabled under control of the signals inputted by the first control signal input terminal TX_SW1 and the second control signal input terminal TX_SW2, and the signal output terminal Out outputs a touch control signal to the touch electrode. At this point, the touch electrode is used as a touch reference electrode to receive the touch control signal.

One driving unit 100 may correspond to one touch electrode on the array substrate. Different touch electrodes may correspond to different driving units 100. In other words, each of the driving units 100 may be used for driving a respective touch electrode. The signal output terminal Out of the driving unit 100 may be connected to one touch electrode on the array substrate.

In this embodiment, the driving unit 100 may be designed independent of the driving IC, e.g., may be provided between the driving IC and the touch electrode on the array substrate. The driving unit 100 receives, from the IC, control signals of the first control signal input terminal TX_SW1, the second control signal input terminal TX_SW2, and the gating signal input terminal TX_SEL, to thereby realize time-division driving of the touch electrode. Compared with the control method of using a shift circuit to output the gating signal, this embodiment integrates more control functions into the driving IC, which simplifies the design of driving units and thereby reduces a panel space occupied by the driving circuit for driving the touch electrode. Meanwhile, due to directly providing the gating control signal using the driving IC, the control flexibility can be improved.

Hereinafter, detailed circuit architectures of the driving unit provided by the present disclosure will be described in detail with reference to FIGS. 2-6.

Figure 2:
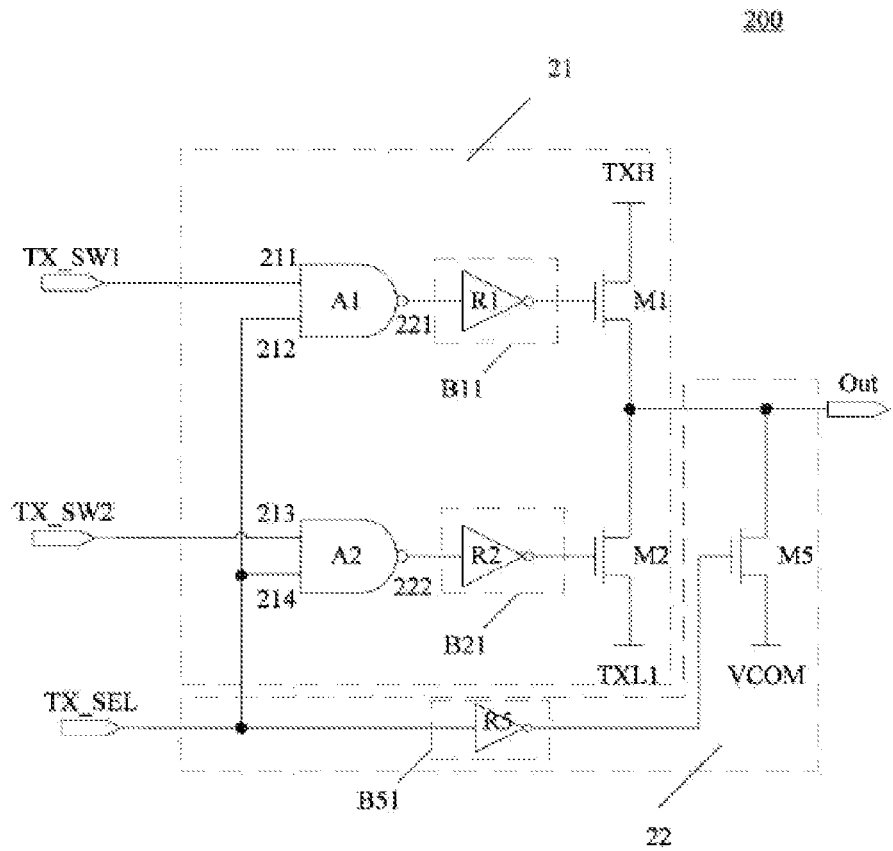
FIG. 2 illustrates a circuit structure diagram of one embodiment of a driving unit of the present invention.

FIG. 2 illustrates a circuit structure diagram of one embodiment of a driving unit of the present invention.

As illustrated in FIG. 2, the touch control driving unit 200 comprises a touch control driving module 21 and a display driving module 22, wherein the touch control driving module 21 comprises a first NAND gate A1, a first inverting unit B11, a first transistor M1, and a first constant-voltage signal input terminal TXH.

The first NAND gate A1 comprises a first input terminal 211, a second input terminal 212, and a first output terminal 221. The first input terminal 211 is connected to the first control signal input terminal TX_SW1, the second input terminal 212 is connected to the gating signal input terminal TX_SEL, and the first output terminal 221 is connected to the input terminal of the first inverting unit B11. The gate of the first transistor M1 is connected to the output terminal of the first inverting unit B11, the first electrode of the first transistor M1 is connected to the first constant-voltage signal input terminal TXH, and the second electrode of the first transistor M1 is connected to the signal output terminal.

In this embodiment, the first inverting unit B11 comprises a first inverter R1. The input terminal of the first inverter B11 is the input terminal of the first inverter R1, and the output terminal of the first inverting unit B11 is the output terminal of the first inverter R1.

The touch control driving module 21 further comprises a second NAND gate A2, a second inverting unit B21, a second transistor M2, and a second constant voltage signal input terminal TXL1.

The second NAND gate A2 comprises a third input terminal 213, a fourth input terminal 214, and a second output terminal 222. The third input terminal 213 is connected to a second control signal input terminal TX_SW2, the fourth input terminal 214 is connected to the gating signal input terminal TX_SEL, and the second output terminal 222 is connected to the input terminal of the second inverting unit B21. The gate of the second transistor M2 is connected to the output terminal of the second inverting unit B21. The first electrode of the second transistor M2 is connected to the second constant-voltage signal input terminal TXL1, and the second electrode of the second transistor M2 is connected to the signal output terminal Out.

In this embodiment, the second inverting unit B21 comprises a second inverter R2, the input terminal of the second inverting B21 is the input terminal of the second inverter R2, and the output terminal of the second inverting B21 is the output terminal of the second inverter R2.

In the driving unit 200 of FIG. 2, the number of first inverters included in the first inverting unit B11 and the number of second inverters included in the second inverting unit B21 are both odd. At this point, channel types of the first transistor M1 and second transistor M2 are identical. For example, the first transistor M1 and the second transistor M2 in FIG. 2 are both N-type transistors. In a specific implementation, both of the second transistor M2 and the first transistor M1 may be P-type transistors. The first transistor M1 and the second transistor M2, when being turned on, transmit a first constant-voltage signal and a second constant-voltage signal to the signal output terminal Out, respectively, wherein the first constant-voltage signal may be a high-level signal, and the second constant-voltage may be a low-level signal.

The first NAND gate A1 is for performing a NAND operation to a signal inputted by the first control signal input terminal TX_SW1 and a signal inputted by the gating signal input terminal TX_SEL. The resulted signal, after being inverted by the first inverting unit B11, becomes a turn-on control signal or a turn-off control signal of the first transistor M1. The second NAND gate A2 is for performing a NAND operation to a signal inputted by the second control signal input terminal TX_SW2 and a signal inputted by the gating signal input terminal TX_SEL. The resulted signal, after being inverted by the second inverting unit B21, becomes a turn-on control signal or a turn-off control signal of the second transistor M2.

The display driving module 22 comprises a fifth transistor M5, a fifth inverting unit B51, and a common voltage signal input terminal VCOM.

In the display driving module 22, the input terminal of the fifth inverting unit B51 is connected to the gating signal input terminal TX_SEL, and the output terminal of the fifth inverting unit B51 is connected to the gate of the fifth transistor M5. The first electrode of the fifth transistor M5 is connected to the common voltage signal input terminal VCOM, and the second electrode of the fifth transistor M5 is connected to the signal output terminal Out.

In this embodiment, the fifth inverting unit B51 comprises a fifth inverter R5. The input terminal of the second inverter B51 is the input terminal of the fifth inverter R5, and the output terminal of the second inverting unit B51 is the output terminal of the fifth inverter R5.

In the driving unit 200 of FIG. 2, the number of first inverters included in the first inverting unit B11 and the number of fifth inverters included in the fifth inverting unit B51 are both odd. At this point, channel types of the fifth transistor M5 and first transistor M1 are identical. For example, the fifth transistor M5 and the first transistor M1 in FIG. 2 are both N-type transistors. In a specific implementation, both of the fifth transistor M5 and the first transistor M1 may be P-type transistors.

In this embodiment, the first transistor M1 and the second transistor M2 may be alternately turned on during a touch detecting phase so as to provide a touch control signal to the touch electrode. The fifth transistor M5 is turned on during a display phase so as to transmit a common voltage signal to the touch electrode. Specifically, the touch control driving module 21 may be selected through the gating signal input terminal TX_SEL during the touch detecting phase, while the display driving module 22 is closed. Base on signals inputted by the first control signal input terminal TX_SW1 and the second control signal input terminal TX_SW2, the first transistor M1 and the second transistor M2 are controlled sequentially to be turned on, so as to alternately provide the high-level signal inputted by the first constant-voltage signal input terminal TXH and the low-level signal inputted by the second constant-voltage signal input terminal TXL1 to the touch electrode. During the display phase, the touch electrode may be multiplexed as a common electrode. Through the gating signal input terminal, the display driving module 22 is selected, the touch control driving module 21 is closed, and the signal inputted by the common-voltage signal input terminal VCOM is transmitted to the touch electrode.

The driving unit 200 provided by the embodiment above may implement time-division driving of the touch electrode, wherein the signal inputted by the gating control signal input terminal TX_SEL may be directly provided by the driving IC, then the driving IC may drive a plurality of touch electrodes in any sequence, thereby improving the flexibility of driving the touch electrode.

Figure 3:
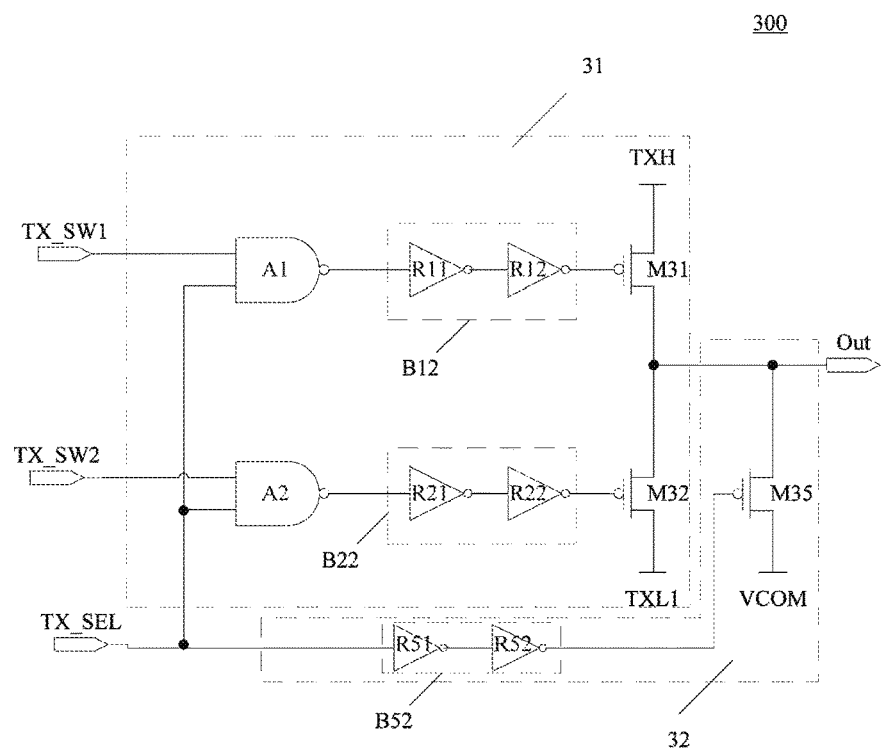
FIG. 3 illustrates a circuit structure diagram of another embodiment of a driving unit of the present invention.

Continue to refer to FIG. 3, in which a circuit structure diagram of another embodiment of a driving unit of the present invention is presented.

As illustrated in FIG. 3, the touch control driving unit 300 comprises a touch control driving module 31 and a display driving module 32. The touch control driving module 31 comprises a first NAND gate A1, a first inverting unit B12, a first transistor M31, a first constant-voltage signal input terminal TXH, a second inverting unit B22, a second transistor M32, and a second constant-voltage signal input terminal TXL1. The display driving module 32 comprises a fifth transistor M35, a fifth inverting unit B52, and a common-voltage signal input terminal VCOM.

The difference between the driving unit 300 and the driving unit 200 of FIG. 2 lies in that in the touch control driving module 31, the first inverting unit B12 comprises two cascaded first inverters R11 and R12, wherein the input terminal of the first inverter R11 is the input terminal of the first inverting unit B12, the output terminal of the first inverter R11 is connected to the input terminal of the first inverter R12, and the output terminal of the first inverter R12 is the output terminal of the first inverting unit B12.

The second inverting unit B22 comprises two cascaded second inverters R21 and R22, wherein the input terminal of the second inverter R21 is the input terminal of the second inverting unit B22, the output terminal of the second inverter R21 is connected to the input terminal of the second inverter R22, and the output terminal of the second inverter R22 is the output terminal of the second inverting unit B22.

In the display driving module 32, the fifth inverting unit B52 comprises two cascaded fifth inverters R51 and R52, wherein the input terminal of the fifth inverter R51 is the input terminal of the fifth inverting unit B52, the output terminal of the fifth inverting R51 is connected to the input terminal of the fifth inverter R52, and the output terminal of the fifth inverter R52 is the output terminal of the fifth inverting unit B52.

In the driving unit 300, the number of first inverters included in the first inverting unit B12 and the number of second inverters included in the second inverting unit B22 are both even numbers. The channel type of the first transistor M31 is identical to that of the second transistor M32, which may both be P-type transistors. The number of first inverters included in the first inverting unit B12 and the number of fifth inverters included in the fifth inverting unit B52 are both even numbers. The channel type of the first transistor M31 is identical to that of the fifth transistor M35, which may be both P-type transistors.

Figure 4:
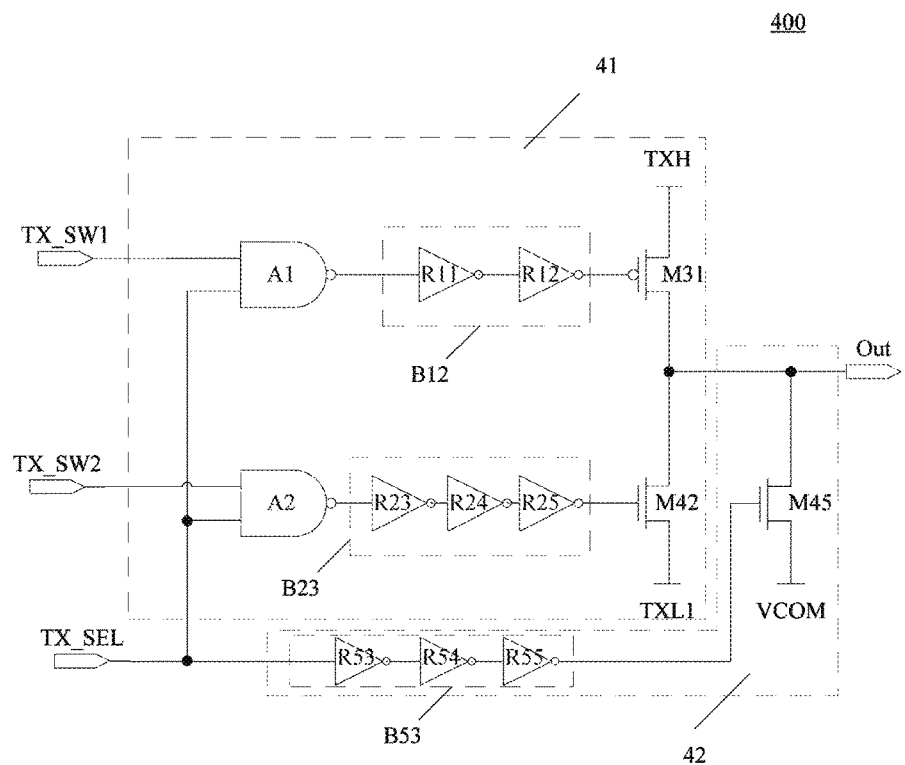
FIG. 4 illustrates a circuit structure diagram of a further embodiment of a driving unit of the present invention.

Continue to refer to FIG. 4, in which a circuit structure diagram of a further embodiment of a driving unit of the present invention is presented.

As illustrated in FIG. 4, the touch control driving unit 400 comprises a touch control driving module 41 and a display driving module 42. The touch control driving module 41 comprises a first NAND gate A1, a first inverting unit B12, a first transistor M31, a first constant-voltage signal input terminal TXH, a second inverting unit B23, a second transistor M42, and a second constant-voltage signal input terminal TXL1. The display driving module 42 comprises a fifth transistor M45, a fifth inverting unit B53, and a common voltage signal input terminal VCOM.

The difference between the driving unit 400 and the driving unit 300 of FIG. 3 lines in that in the touch control driving module 41, the second inverting unit B23 comprises three cascaded second inverters R23, R24, and R25, wherein the input terminal of the second inverter R23 is the input terminal of the second inverting unit B23, the output terminal of the second inverter R23 is connected to the input terminal of the second inverter R24, the output terminal of the second inverter R24 is connected the input terminal of the second inverter R25, and the output terminal of the second inverter R25 is the output terminal of the second inverting unit B23.

In the display driving module 42, the fifth inverting unit B53 comprises three cascaded fifth inverters R53, R54, and R55, wherein the input terminal of the fifth inverter R53 is the input terminal of the fifth inverting unit B53, the output terminal of the fifth inverter R53 is connected to the input terminal of the fifth inverter R54, the output terminal of the fifth inverter R54 is connected to the input terminal of the fifth inverter R55, and the output terminal of the fifth inverter R55 is the output terminal of the fifth inverting unit B53.

In the driving unit 400, the number of first inverters included in the first inverting unit B12 is an even number, the number of second inverters included in the second inverting unit B23 is an odd number, the number of fifth inverters included in the fifth inverting unit B53 is an odd number. Then, a channel type of the first transistor M31 is different from that of the second transistor M42, and the channel type of the first transistor M31 is different from that of the fifth transistor M45, e.g., the first transistor M31 is a P-type transistor, and the second transistor M42 and the fifth transistor M45 are N-type transistors.

It should be noted that the circuit structure diagrams of the driving units with different numbers of inverters in the first inverting unit, second inverting unit, and fifth inverting unit have been exemplarily illustrated. In the embodiment of the present disclosure, the first inverting unit may comprise m cascaded first inverters. The second inverting unit may comprise n cascaded second inverters; and the fifth inverting units may comprise p cascaded fifth inverters, where m, n, p are positive integers, i.e., m, n, p may be any integer greater than 1. When m, n are odd numbers or m, n are even numbers, the channel types of the first and second transistors are identical. When one of m, n is an odd number, while the other is an even number, the channel types of the first and second transistors are different. When m, p are both odd numbers or m, p are both even numbers, the channel types of the first and fifth transistors are identical. When one of m, p is an odd number while the other is an even number, the channel types of the first and fifth transistors are different. The present disclosure does not limit the number of first inverters in the first inverting unit, the number of second inverters in the second inverting unit, and the number of fifth inverters in the fifth inverting unit.

Figure 5:
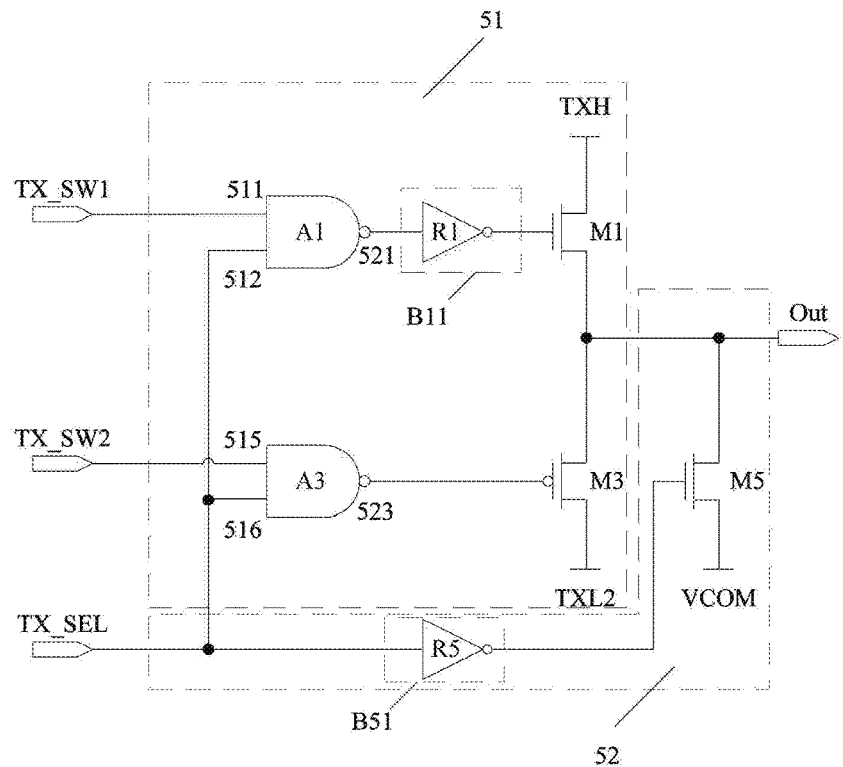
FIG. 5 illustrates a circuit structure diagram of a still further embodiment of a driving unit of the present invention.

Continue to refer to FIG. 5, in which a circuit structure diagram of a still further embodiment of a driving unit of the present invention is presented.

As illustrated in FIG. 5, a touch control driving unit 500 comprises a first control signal input terminal TX_SW1, a second control signal input terminal TX_SW2, a gating signal input terminal TX_SEL, a touch control driving module 51, a display driving module 52, and a signal output terminal Out. The touch control driving module 51 comprises a first NAND gate A1, a first inverting unit B11, a first transistor M1, and a first constant-voltage signal input terminal TXH.

The first NAND gate A1 comprises a first input terminal 511, a second input terminal 512, and a first output terminal 521. The first input terminal 511 is connected to the first control signal input terminal TX_SW1, the second input terminal 512 is connected to the gating signal input terminal TX_SEL, and the first output terminal 521 is connected to the input terminal of the first inverting unit B11. The gate of a first transistor M1 is connected to the output terminal of the first inverting unit B11, the first electrode of the first transistor M1 is connected to the first constant-voltage signal input terminal TXH, and the second electrode of the first transistor M1 is connected to the signal output terminal.

The touch control driving module 51 further comprises a third NAND gate A3, a third transistor M3, and a third constant-voltage signal input terminal TXL2.

The third NAND gate A3 comprises a fifth input terminal 515, a sixth input terminal 516, and a third output terminal 523. The fifth input terminal 515 is connected to the second control signal input terminal TX_SW2, the sixth input terminal 516 is connected to the gating signal input terminal TX_SEL, the third output terminal 523 is connected to the gate of the third transistor M3. The first electrode of the third transistor M3 is connected to a third constant-voltage signal input terminal TXL2, the second electrode of the third transistor M3 is connected to the signal output terminal Out. The channel type of the first transistor M1 is different from that of the third transistor M3, for example, in FIG. 5, the first transistor M1 is a N-type transistor, and the third transistor M3 is a P-type transistor. In a specific implementation, the first transistor M1 and the third transistor M3 may also be P-type transistor and N-type transistor, respectively.

The display driving module 52 comprises a fifth transistor M5, a fifth inverting unit B51, and a common voltage signal input terminal VCOM.

In the display driving module 52, the input terminal of the fifth inverting unit B51 is connected to the gating signal input terminal TX_SEL, the output terminal of the fifth inverting unit B51 is connected to the gate of the fifth transistor M5. The first electrode of the fifth transistor M5 is connected to the common voltage signal input terminal VCOM, and the second electrode of the fifth transistor M5 is connected to the signal output terminal Out. The channel type of the fifth transistor M5 is identical to the channel type of the first transistor M1, for example, the fifth transistor M5 and the first transistor M1 as illustrated in FIG. 2 are both N-types of transistors. In a specific implementation, both of the fifth transistor M5 and the first transistor M1 may be P-type transistors.

It may be seen from FIG. 5 that the difference between the driving unit 500 and the driving unit 200 as illustrated in FIG. 2 lies in that in the touch control driving module 51 of the driving unit 500, the output terminal 523 of the third NAND gate A3 is directly connected to the gate of the third transistor M3, i.e., the signal inputted by the second control signal input terminal TX_SW2 and the signal inputted by the gating signal input terminal TX_SEL, after being subjected to the operation of the third NAND gate A3, is directly outputted to the gate of the third transistor M3 without being subjected to the inversion operation of the inverter. The second inverting unit B21 in the driving unit 200 may perform voltage stabilizing and signal enhancing processing to the signal outputted by the second NAND gate A2. Compared with directly providing the signal outputted by the third NAND gate A3 to the third transistor M3 in the driving unit 500, the control signal of the gate of the second transistor M2 in the driving unit 200 is more stable and may guarantee that the strength (e.g., voltage value) of the control signal of the second transistor M2 gate is enough to turn on the second transistor M2. In this way, the driving competence is enhanced.

Figure 6:
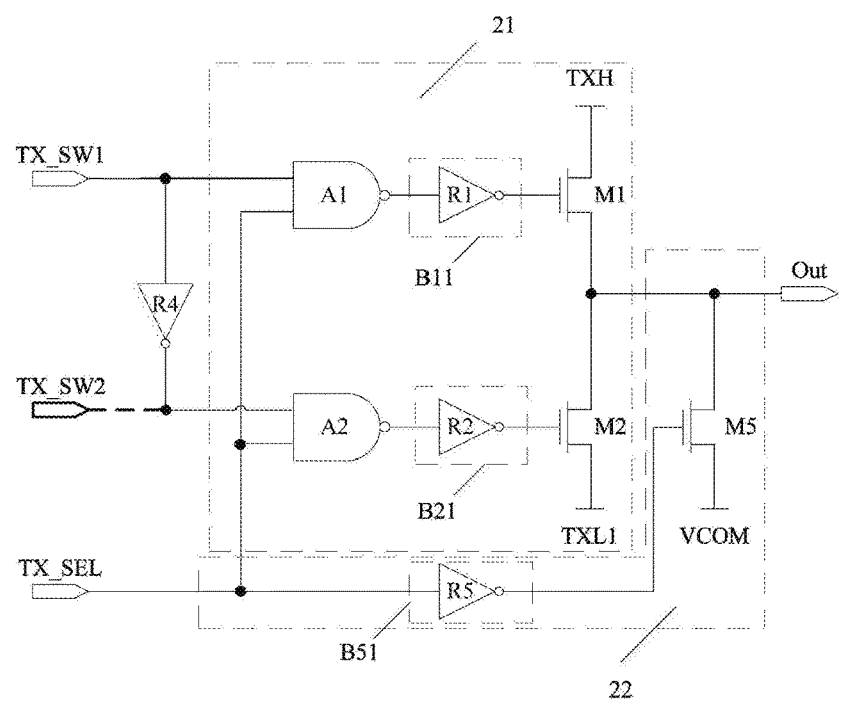
FIG. 6 illustrates a circuit structure diagram of a yet further embodiment of a driving unit of the present invention.

Continue to refer to FIG. 6, in which a circuit structure diagram of a yet further embodiment of a driving unit of the present invention is illustrated.

As illustrated in FIG. 6, based on the driving unit 200 as illustrated in FIG. 2, the driving unit 600 further comprises a fourth inverter R4. The input terminal of the fourth inverter R4 is connected to the first control signal input terminal TX_SW1, and the output terminal of the fourth inverter R4 is connected to a second control signal input terminal TX_SW2.

In the driving unit 600, the signal outputted by the second control signal input terminal TX_SW2 is an inverted signal with respect to the signal outputted by the first control signal input terminal TX_SW1. Compared with the driving unit 200 as illustrated in FIG. 2, the driving IC may only provide a first control signal and a gating signal to the first control signal input terminal TX_SW1 and the gating signal input terminal TX_SEL1 of the driving unit 600, respectively, and the driving unit 600 generates a second control signal of the second control signal input terminal TX_SW2, to thereby reduce the load of the driving IC, which is advantages to reduce power consumption.

Figure 7:
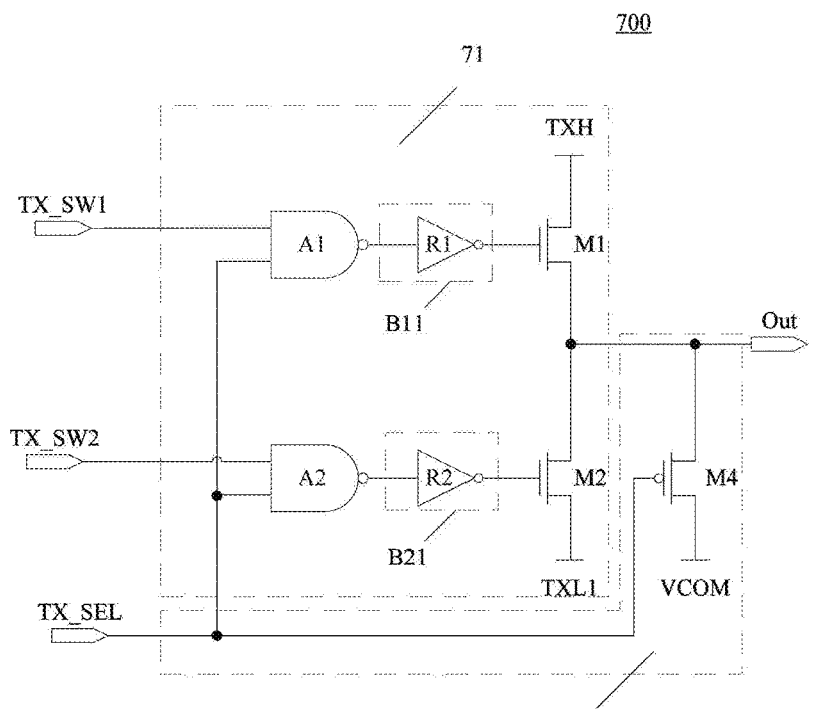
FIG. 7 illustrates a circuit structure diagram of another embodiment of a driving unit of the present invention.

Continue to refer to FIG. 7, in which a circuit structure diagram of another embodiment of a driving unit of the present invention is presented.

As illustrated in FIG. 7, the driving unit 700 comprises a first control signal input terminal TX_SW1, a second control signal input terminal TX_SW2, a gate signal input terminal TX_SEL, a touch control driving module 71, a display driving module 72, and a signal output terminal Out. The circuit structure of the touch control driving module 71 is consistent with the circuit structure of the touch control driving module 21 in the driving unit 200.

In this embodiment, the display driving module 72 comprises a fourth transistor M4 and a common voltage signal input terminal VCOM. The gate of the fourth transistor M4 is connected to the gate signal input terminal TX_SEL, the first electrode of the fourth transistor M4 is connected to the common voltage signal input terminal VCOM, and the second electrode of the fourth transistor M4 is connected to a signal output terminal Out. The channel type of the fourth transistor M4 is different from the channel type of the first transistor M1, for example, in FIG. 7, the first transistor M1 is a N-type transistor, and the fourth transistor M4 is a P-type transistor.

Compared with the driving unit 200 as illustrated in FIG. 2, the display driving module 72 of the driving unit 700 as illustrated in FIG. 7 is directly controlled by a signal inputted by the gating signal input terminal TX_SEL. When the display driving module 72 is selected by the gating signal, the display driving module 72 may immediately outputs a common voltage signal to the signal output terminal Out. During this procedure, enabling of the display driving module 72 will not be delayed, which guarantees stable running of the driving circuit.

It should be noted that the preferred embodiment of the driving unit of the present invention is not limited to various embodiments described with reference to FIGS. 2-7, but may include a combination of any of the touch control driving modules and any of the display driving modules in FIGS. 2-7, e.g., may comprise a driving unit combining the control driving module 51 and the display driving module 72. The circuit structure and connection relationship are similar to the driving units in various embodiments above, the detailed description of which will not be omitted here.

The present disclosure further provides a driving method for driving the driving unit described in the embodiments above. Specifically, the driving method comprises: during a display stage, providing a first level signal to the first control signal input terminal TX_SW1 and the gating signal input terminal TX_SEL, and outputting, by the driving unit, a common voltage signal COM inputted by a common voltage signal input terminal VCOM; during a touch detection phase, providing a first pulse signal to the first control signal input terminal TX_SW1, providing a second level signal to the gating signal input terminal TX_SEL, and outputting, by the driving unit, a periodical touch control signal; wherein the voltage value of the first level signal is different from the voltage value of the second level signal. For example, the first level signal may be a low level signal, while the second level signal may be a high level signal.

Figure 8:
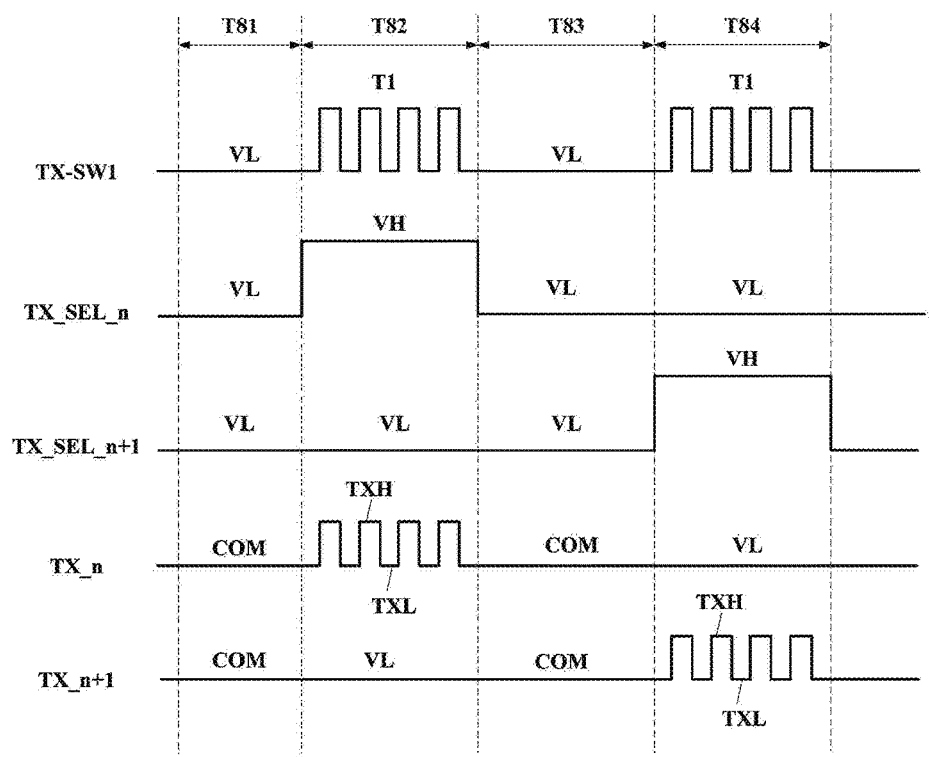
FIG. 8 illustrates a working timing diagram of the driving unit of FIG. 6.

Further refer to FIG. 8, in which a working timing diagram of the driving unit of FIG. 6 is presented. In FIG.

8, TX_SW1 represents signals inputted by the first control signal input terminal TX_SW1, TX_SEL_n and TX_SEL_n+1 represent the $n^{th}$ gating signal input terminal TX_SEL_n and n+1$^{th}$ gating signal input terminal TX_SEL_n+1, respectively; TX_n and TX_n+1 represent signals outputted by the $n^{th}$ driving unit and the signal output terminal Out of the n+1$^{th}$ driving unit, respectively, i.e., representing the signals received by the $n^{th}$ touch electrode and the n+1$^{th}$ touch electrode.

As illustrated in FIG. 8, during the display phase T81, a low-level signal VL is provided to the first control signal input terminal TX_SW1 and the gating signal input terminals TX_SEL_n and TX_SEL_n+1. In this case, the first NAND gate A1 and the second NAND gate A2 in the $n^{th}$ driving unit 600 and the n+1$^{th}$ driving unit 600 output high-level signals. After the high-level signals are inverted by the first inverting unit B11 and the second inverting unit B21, gates of the first transistor M1 and the second transistor M2 both receive low-level signals. The first transistor M1 and the second transistor M2 are both turned off, and the touch control driving module is closed.

The display driving module 22 in the driving unit 600 is enabled, and the fifth transistor M5 is turned on to transmit the signal inputted by the common voltage signal input terminal to the signal output terminal Out.

During the touch detection phase T82, a first pulse signal T1 is provided to the first control signal input terminal TX_SW1, and a second level signal VH is provided to the $n^{th}$ gating signal input terminal TX_SEL_n corresponding to the $n^{th}$ driving unit 600. The display driving module 22 of the $n^{th}$ driving unit 600 is switched off under control of the gating signal input terminal TX_SEL_n. The touch control driving module 21 of the $n^{th}$ driving unit is enabled. After the first NAND gate A1 performs a NAND operation to the first pulse signal T1 and the second level signal VH, the first inverting unit B11 performs an inversion processing to the signal outputted by the first NAND gate A1 and transmits the inverted signal to the gate of the first transistor M1. In this case, the signal received by the gate of the first transistor M1 is consistent with the first pulse signal T1. Then the signal output terminal Out of the $n^{th}$ driving unit 600 outputs, during a period when the first pulse signal T1 is at a high level, the high-level signal inputted by the first constant-voltage signal input terminal TXH.

After the second NAND gate A2 performs the NAND operation to the inverted signal of the first pulse signal T1 and the second level signal VH, the second inverting unit B21 performs inversion processing to the signal outputted by the second NAND gate A2 and transmits the inverted signal to the gate of the second transistor M2. At this point, the signal received by the gate of the second transistor M2 is inverted to the first pulse signal T1. Then the signal output terminal Out of the $n^{th}$ driving unit 600 outputs, during the period when the first pulse signal T1 is at a low level, the low-level signal inputted by the second constant-voltage signal input terminal TXL1, i.e., the $n^{th}$ touch electrode TX_n outputs a periodical touch control signal.

The touch control signal outputted by the $n^{th}$ driving unit 600 has a same cycle and a same duty cycle as the first pulse signal T1. Moreover, the rising edge and falling edge of the touch control signal are also consistent with the rising edge and falling edge of the first pulse signal T1, respectively. A peak valve and a valley value of the touch control signal outputted by the driving unit 600 are provided by the first constant-voltage signal input terminal TXH and the second constant-voltage signal input terminal TXL1, respectively.

During the touch detection phase T82, a first level signal VL is provided to the n+1$^{th}$ gating signal input terminal TX_SEL_n+1 corresponding to the n+1$^{th}$ driving unit 600. The touch control driving module 21 and the display driving module 22 of the n+1$^{th}$ driving unit are closed, and the n+1$^{th}$ driving unit 600 outputs the first level signal VL, i.e., the n+1$^{th}$ touch electrode TX_n+1 receives the first level signal VL.

During the display phase T83, a low-level signal VL is provided to the first control signal input terminal TX_SW1 and the gating signal input terminal TX_SEL_n and the TX_SEL_n+1. Similar to the display phase T81, the display driving module 22 in the $n^{th}$ and n+1$^{th}$ driving units 600 are enabled, and the fifth transistors M5 are turned on to transmit the signal inputted by the common voltage signal input terminal to the signal output terminal Out, i.e., the $n^{th}$ touch electrode TX_n and the n+1$^{th}$ touch electrode TX_n+1 receive the common voltage signal COM inputted by the common voltage signal input VCOM.

During the touch detection phase T84, a first pulse signal T1 is provided to the first control signal input terminal TX_SW1, and a second level signal VH is provided to the n+1$^{th}$ gating signal input terminal TX_SEL_n+1 corresponding to the n+1$^{th}$ driving unit 600. The display driving module 22 of the n+1$^{th}$ driving unit 600 is switched off under control of the gating signal input terminal TX_SEL_n+1. The touch control driving module 21 of the n+1$^{th}$ driving unit is enabled. After the first NAND gate A1 performs NAND operation to the first pulse signal T1 and the second level signal VH, the first inverting unit B11 performs inversion processing to the signal outputted by the first NAND gate A1 and transmits the inverted signal to the gate of the first transistor M1. At this point, the signal received by the gate of the first transistor M1 is consistent with the first pulse signal T1, and then the signal output terminal Out of the n+1$^{th}$ driving unit 600 outputs, within a period when the first pulse signal T1 is at a high level, the high level signal inputted by the first constant-voltage signal input terminal TXH.

After the second NAND gate A2 performs NAND operation to the second level signal VH and the inverted signal of the first pulse signal T1, the second inverting unit B21 performs an inversion processing to the signal outputted by the second NAND gate A2 and transmits the inverted signal to the gate of the second transistor M2. At this point, the signal received by the gate of the second transistor M2 is inverted to the first pulse signal T1. Then the signal output terminal Out of the n+1$^{th}$ driving unit 600 outputs, during the period when the first pulse signal T1 is at a low level, the low-level signal inputted by the second constant-voltage signal input terminal TXL1, i.e., the n+1$^{th}$ touch electrode TX_n outputs a periodic touch control signal.

The touch control signal outputted by the n+1$^{th}$ driving unit 600 has a same cycle and a same duty cycle as the first pulse signal T1, and the rising edge and the falling edge of the touch control signal are also consistent with the rising edge and the falling edge of the first pulse signal T1. A peak value and a valley value of the touch control signal outputted by the driving unit 600 are provided by the first constant-voltage signal input terminal TXH and the second constant-voltage signal input terminal TXL1.

During the touch detection phase T84, a first level signal VL is provided to the $n^{th}$ gating signal input terminal TX_SEL_n corresponding to the $n^{th}$ driving unit 600. The touch control driving module 21 and the display driving module 22 of the $n^{th}$ driving unit 600 are closed. The $n^{th}$ driving unit 600 outputs the first level signal VL, i.e., the $n^{th}$ touch electrode TX_n receives the first level signal VL.

It can be seen from the working timing shown in FIG. 8 that the driving units provided by the embodiments of the present disclosure may perform display driving and touch driving to respective touch electrodes. During the display phase, the driving unit may provide a common voltage signal to the touch electrode. During multiple touch detection phases, a touch scanning signal may be provided sequentially to respective touch electrodes. The signals inputted by the gating signal input terminals corresponding to respective touch electrodes may be directly provided by the driving IC, without a need of designing an additional shift circuit to generate the gating signals, which simplifies the driving circuit of the touch electrode, and meanwhile the driving IC may scan the touch electrodes in any sequence, thereby improving the control flexibility.

Further, if the driving unit does not include the fourth inverter R4, i.e., the first control signal input terminal TX_SW1 and the second control signal input terminal TX_SW2 are not connected via a fourth inverter R4, like the driving unit 200 shown in FIG. 2, based on the embodiments above, a driving method provided by the present disclosure further comprises: during a display phase, providing a first level signal to a second control signal input terminal; during a touch detection phase, providing a second pulse signal to the second control signal input terminal; wherein a cycle of the second pulse signal is the same as a cycle of the first pulse signal.

Figure 9:
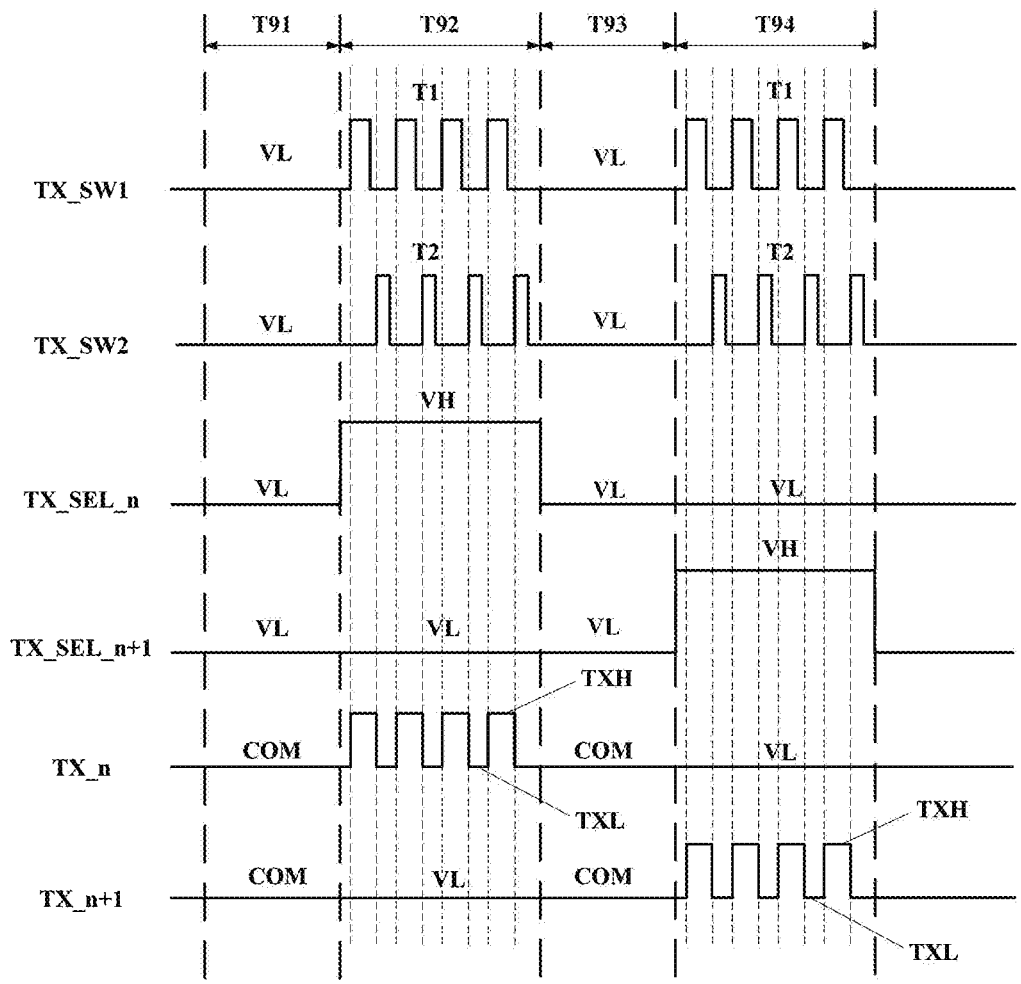
FIG. 9 illustrates a working timing diagram of the driving unit of FIG. 2.

Further refer to FIG. 9, in which a working timing diagram of the driving unit of FIG. 2 is presented.

During the display phase T91 and the display phase T93, a low level signal VL is provided to the first control signal input terminal TX_SW1, the second control signal input terminal TX_SW2, and gating signal input terminals TX_SWL_n and TX_SEL_n+1. Similar to the display phase T81, the touch control driving modules 21 in the $n^{th}$ driving unit and the n+1$^{th}$ driving unit 200 are closed. The display driving module 22 in the $n^{th}$ driving unit and the n+1$^{th}$ driving unit 200 are enabled. The fifth transistors M5 are conducted to transmit the signal COM inputted by the common voltage signal input terminals VCOM to the signal output terminals Out, i.e., the $n^{th}$ touch electrode TX_n and the n+1$^{th}$ touch electrode TX_n+1 receive a common voltage signal COM inputted by the common voltage signal input terminals VCOM.

During the touch detection phase T92, a first pulse signal T1 is provided to the first control signal input terminal TX_SW1, a second pulse signal T2 is provided to the second control signal input terminal TX_SW2, a second level signal VH is provided to a gating signal input terminal TX_SEL_n corresponding to the $n^{th}$ driving unit, and a low level signal VL is provided to the gating signal input terminal TX_SEL_n+1 corresponding to the n+1$^{th}$ driving unit. At this point, the display driving module 22 of the $n^{th}$ driving unit 200 is switched off under control of the gating signal input terminal TX_SEL_n, the touch control driving module 21 of the $n^{th}$ driving unit 200 is enabled. After the first NAND gate A1 performs NAND operation to the first pule signal T1 and the second level signal VH, the first inverting unit B11 performs inversion processing to the signal outputted by the first NAND gate A1 and transmits the inverted signal to the gate of the first transistor M1. At this point, the signal received by the gate of the first transistor M1 is consistent with the first pulse signal T1. Then the signal output terminal Out of the $n^{th}$ driving unit 200 outputs, during a period when the first pulse signal T1 is at a high level, the high level signal inputted by the first constant voltage signal input terminal TXH.

After the second NAND gate A2 performs NAND operation to the second pulse signal T2 and the second level signal VH, the second inverting unit B21 performs inversion processing to the signal outputted by the second NAND gate A2 and transmits the inverted signal to the gate of the second transistor M2. At this point, the signal received by the gate of the second transistor M2 is the second pulse signal. Then the signal output terminal Out of the $n^{th}$ driving unit 200 outputs, during the period when the second pulse signal T2 is at a high level, a low level signal inputted by the second constant signal input terminal.

It may be seen from FIG. 9 that during the touch detection period T92, the rising edge of the second pulse signal T2 inputted by the second control signal input terminal TX_SW2 has a certain time delay compared with the falling edge of the first pulse signal T1 inputted by the first control signal input terminal TX_SW1. After the falling edge of the first pulse signal T1 arrives but before the rising edge of the second pulse signal T2 arrives, the signal outputted by the $n^{th}$ signal output terminal Out (i.e., the signal received by the $n^{th}$ touch electrode) maintains the high-level signal inputted by the first constant-voltage signal input terminal TXH. When the signals inputted by the first control signal input terminal TX_SW1 and the second control signal input terminal TX_SW2 flip simultaneously, the states of the first transistor M1 and the second transistor M2 change simultaneously, such that a scenario possibly exists that both of the first transistor M1 and the second transistor M2 are in an on-state. At this point, the signals inputted by the first constant voltage input terminal TXH and the second constant voltage input terminal TXL1 are simultaneously transmitted to the signal output terminal Out, causing the signal received by the touch electrode unstable. The driving method using the working timing illustrated in FIG. 9 may avoid the first transistor M1 and the second transistor M2 to be simultaneously in an on-state, thereby guaranteeing stability of the signal outputted by the driving unit.

Further, during the touch detection phase T92, a first level signal VL is provided to the n+1$^{th}$ gating signal input terminal TX_SEL_n+1 corresponding to the n+1$^{th}$ driving unit 200. The touch control driving module and the display driving module of the n+1$^{th}$ driving unit are closed, and the n+1$^{th}$ driving unit outputs the first level signal VL, i.e., the n+1$^{th}$ touch electrode TX_n+1 receives the first level signal VL.

During the touch detection phase T94, a first pulse signal T1 is provided to the first control signal input terminal TX_SW1, a second pulse signal T2 is provided to the second control signal input terminal TX_SW2, a second level signal VH is provided to the gating signal input terminal TX_SEL_n+1 corresponding to the n+1$^{th}$ driving unit 200, and a low level signal VL is provided to the gating signal input terminal TX_SEL_n corresponding to the $n^{th}$ driving unit. At this point, the touch control driving module 21 in the n+1$^{th}$ driving unit 200 is enabled to output a touch control signal. The touch control driving module 21 and the display driving module 22 in the $n^{th}$ driving unit 200 are both in a closed state, and the first level signal VL is outputted.

During the touch detection phase T94, the working principle of the n+1$^{th}$ driving unit is identical to the working principle of the $n^{th}$ driving unit during the touch detection phase T92, which will not be detailed here.

The present disclosure also provides a driving circuit including the driving unit above, the driving circuit being applied to an array substrate. The array substrate may comprise N touch electrodes, where N is a positive integer.

Figure 10:
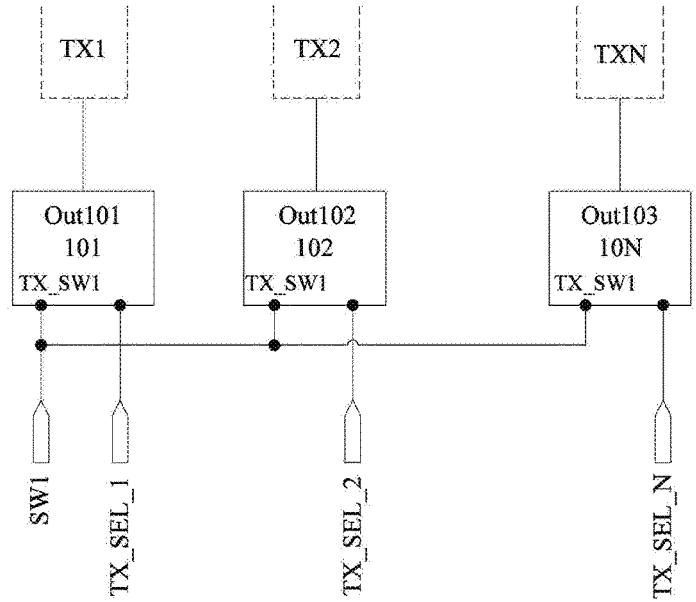
FIG. 10 illustrates a circuit structure diagram of one embodiment of a driving circuit of the present invention.

Please refer to FIG. 10, in which a circuit structure diagram of one embodiment of a driving circuit of the present invention is presented. As illustrated in FIG. 10, the driving circuit 1000 comprises N driving units 101, 102, ..., 10N, and a first touch control signal input terminal SW1, wherein the driving unit 101, 102, ..., 10N may be any driving unit described in the embodiments above. Signal output terminals Out101, Out102, ..., Out10N of the driving units 101, 102, ..., 10N are electrically connected to touch electrodes TX1, TX2, ..., TXN in one-to-one correspondence. The first control signal input terminal TX_SW1 of each driving unit is connected to the first touch control signal input terminal SW1.

Optionally, the driving units 101, 102, ..., 10N may be the driving unit 400 including a fourth inverter R4, wherein the input terminal of the fourth inverter R4 is connected to the first control signal input terminal TX_SW1 of the driving unit, and the output terminal of the fourth inverter is connected to a second control signal input terminal TX_SW2.

In this embodiment, gating signal input terminals TX_SEL_1, TX_SEL_2, ..., TX_SEL_n of respective driving units 101, 102, ..., 10N may be directly provided with signals by a driving IC on the array substrate. The respective driving units 101, 102, ..., 10N drive corresponding touch electrodes to perform display or touch detection under control of the signals inputted by the driving IC to the corresponding gating signal input terminals TX_SEL_1, TX_SEL_2, ..., TX_SEL_n.

Figure 11:
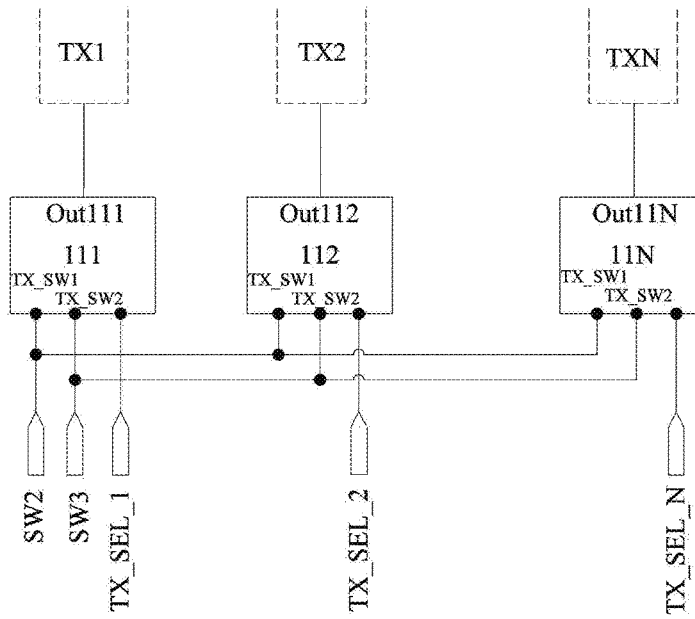
FIG. 11 illustrates a circuit structure diagram of another embodiment of a driving circuit of the present invention.

Continue to refer to FIG. 11, in which a circuit structure diagram of another embodiment of a driving circuit of the present invention is presented. The driving circuit 1100 comprises N driving units 111, 112, ..., 11N, a first touch control signal input terminal SW2 and a second touch control signal input terminal SW3, wherein the driving units 111, 112, ..., 11N may be any driving unit described in the embodiments above. The signal output terminals Out111, Out112, ..., Out11N of the driving units 111, 112, ..., 11N are electrically connected to the touch electrodes TX1, TX2, ..., TXN on the array substrate in one-to-one correspondence. The first control signal input terminal TX_SW1 of each driving unit is connected to the first touch control signal input terminal SW2, and the second control signal input terminal TX_SW2 of each driving unit is connected to the second touch control signal input terminal SW3.

In this embodiment, the gating signal input terminals TX_SEL_1, TX_SEL_2, ..., TX_SEL_n of respective driving units 111, 112, ..., 11N may be provided with signals directly by a driving IC on the array substrate. The respective driving units 111, 112, ..., 11N drives corresponding touch electrodes to perform display or touch detection under control of the signals inputted by the driving IC to the corresponding gating signal input terminals TX_SEL_1, TX_SEL_2, ..., TX_SEL_n.

It can be seen from FIGS. 10 and 11 that the driving circuit provided by the embodiments of the present disclosure may drive a plurality of touch electrodes. Moreover, the driving of the touch electrodes TX1, TX2, ..., TXN need not to be controlled by the shift circuit, but can be flexibly controlled by the gating signal outputted by the driving IC.

Figure 12:
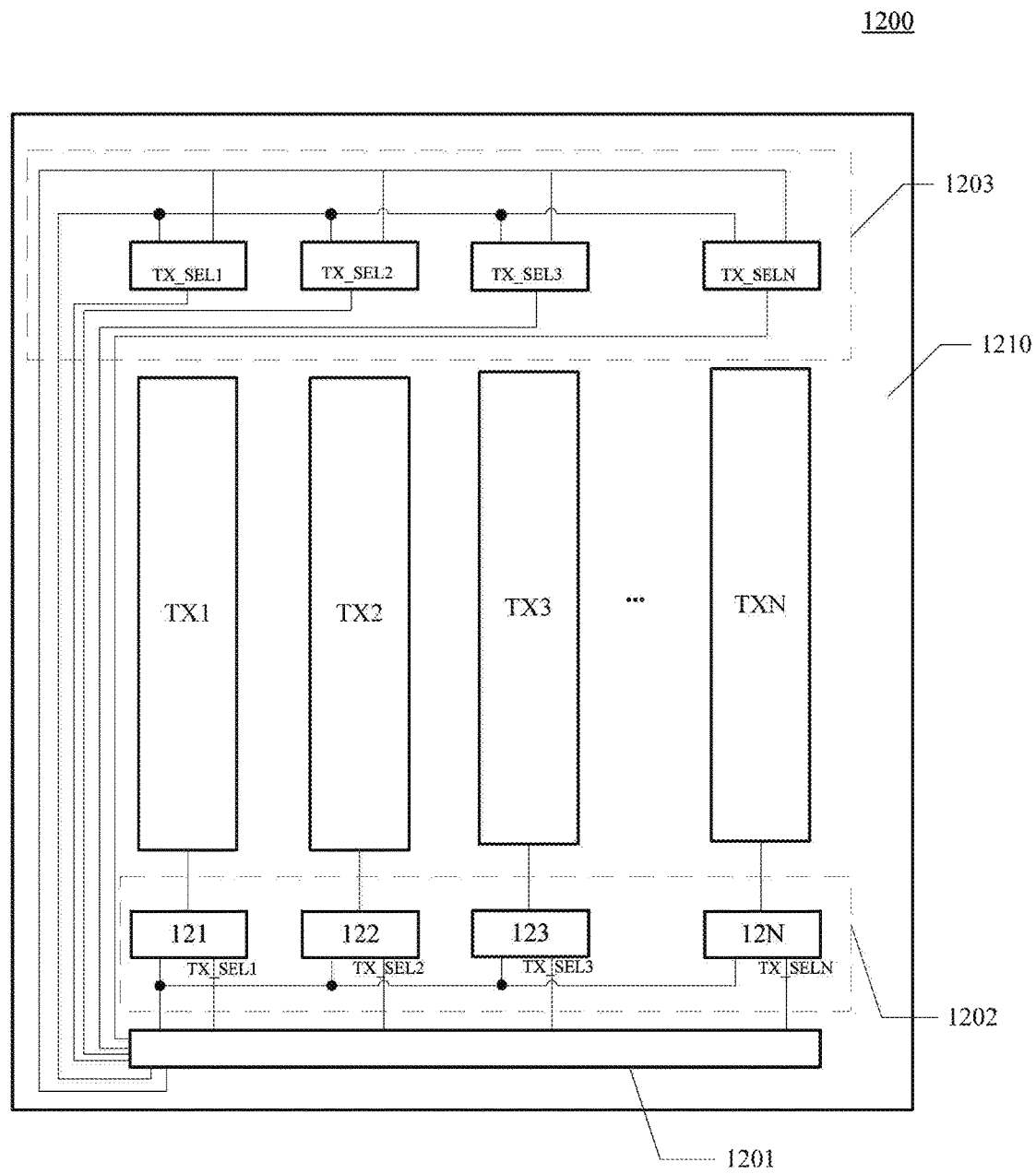
FIG. 12 illustrates a structural diagram of a display panel of the present invention.

Based on the embodiments above, the present disclosure further provides a display panel. Refer to FIG. 12, in which a structural diagram of a display panel of the present invention is presented.

In this embodiment, the display panel 1200 comprises an array substrate 1210. The array substrate 1210 comprises N touch electrodes TX1, TX2, TX3, ..., TXN, a driving IC 1201, and a driving circuit 1202, wherein N is a positive integer.

Signal output terminals of respective units 121, 122, 123, ..., 12N in the driving circuit 1202 are connected to touch electrodes TX1, TX2, TX3, ..., TXN in one-to-one correspondence, and the driving IC 1201 is connected to the driving circuit 1202.

The driving IC 1201 is for providing a first level signal to the first touch control signal input terminal SW1 and the gating signal input terminals TX_SEL1, TX_SEL2, TX_SEL3, ..., TX_SELN during each display phase, provides a first pulse signal to the first touch control signal input terminal SW1 during each touch detection phase, and provides a second level signal to the gating signal input terminal TX_SEL1, TX_SEL2, TX_SEL3, ..., or TX_SELN of one driving unit 121, 122, 123, ..., or 12N during each touch detection phase.

In this embodiment, the driving IC 1201 may be electrically connected with the gating signal input terminal TX_SEL1, TX_SEL2, TX_SEL3, and TX_SELN of respective driving units 121, 122, 123, ..., 12N in the driving circuit 1202. Then during driving, the drive IC 121 may directly provide gating control signals to respective driving units 121, 122, 123, ..., 12N, such that the respective driving units 121, 122, 123, ..., 12N may be controlled independently, therefore the driving of each of the respective touch electrodes TX1, TX2, TX3, TXN is independent. The driving IC 1201 may perform touch scanning or display driving to the touch electrodes TX1, TX2, TX3, TXN in an arbitrary sequence, which improves the control flexibility.

In some embodiments, if the second touch control signal input terminals of respective driving units are not connected to the first control signal input terminal through inverters, the driving IC 1201 is also used for providing a first level signal to the second touch control signal input terminal during each display phase, and providing a second pulse signal to the second touch control signal input terminal during each touch detecting phase, wherein the first pulse signal has a cycle identical to the second pulse signal.

Further, the touch electrode TX may be a strip electrode. Two driving circuits may be provided on the array substrate 1210, e.g., driving circuits 1202 and 1203 as shown in FIG. 12. The driving circuit 1203 is also connected to the driving IC for receiving, from the driving IC, signals that need to be inputted by the first touch control signal input terminal SW1, the second touch control signal input terminal, and the gating signal input terminals TX_SEL1, TX_SEL2, TX_SEL3, ..., TX_SELN. The driving circuits 1202 and 1203 may be provided at two ends along a direction in which the touch electrodes TX1, TX2, TX3, TXN are extending, so as to drive the electrodes TX1, TX2, TX3, ..., TXB from the two ends, which may enhance the touch detection accuracy.

By providing gating control signals to the driving circuit 1202, the driving IC 1201 controls respective driving units to perform display driving or touch driving. In actual applications, touch driving may be performed arbitrarily to respective touch electrodes TX1, TX2, TX3, ..., TXN, that is, the touch electrodes TX1, TX2, TX3, ..., TXN can be driven in any sequence, and the touch scanning can be performed on only a part of touch electrodes, thereby enhancing the control flexibility of the touch scanning.

Figure 13:
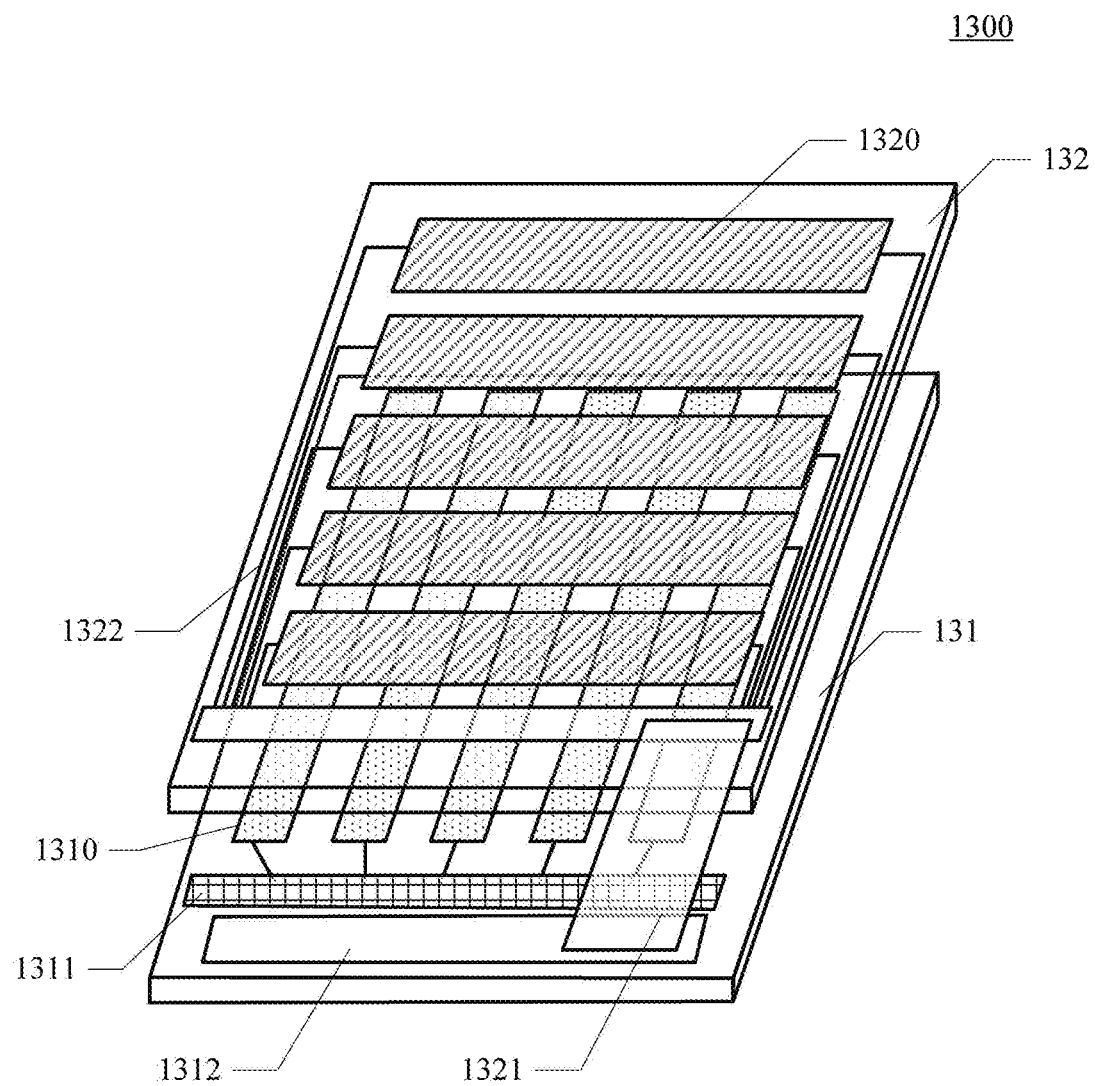
FIG. 13 illustrates another structural diagram of a display panel of the present invention.

Continue to refer to FIG. 13, in which another structural diagram of a display panel of the present invention is presented.

As illustrated in FIG. 13, the display panel 1300 comprises an array substrate 131 and a color film substrate 132 which are provided oppositely to the array substrate 131, wherein the array substrate 131 may be the array substrate 1210 in the display panel 1200 as shown in FIG. 12.

In this embodiment, the touch electrodes on the array substrate 131 are first touch electrodes 1310, and second touch electrodes 1320 are provided on the color film substrate. Both of the first touch electrodes 1310 and the second touch electrodes 1320 are strip electrodes. An extending direction of the first touch electrodes 1310 is inconsistent with an extending direction of the second touch electrodes 1320.

Further, the first touch electrodes 1310 are disposed at one side of the array substrate 131 towards the color film substrate 132, and the second touch electrodes 1320 are disposed at one side of the color film substrate 132 distant away from the array substrate 131.

Further, the display panel 1300 is provided thereon with data lines and scanning lines (not shown in FIG. 13), where an extending direction of the data lines is vertical to an extending direction of the scanning lines. An extending direction of the first touch electrodes 1310 is consistent with an extending direction of the data lines, and an extending direction of the second touch electrodes 1320 is consistent with an extending direction of the scanning lines. In other words, the extending direction of the first touch electrodes 1310 is perpendicular to the extending direction of the second touch electrodes 1320.

The display panel 1300 may also comprise a flexible circuit board 1321. The array substrate 131 further comprises a driving circuit 1311 and a driving IC 1312. The driving circuit 1311 may be the driving circuit shown in FIG. 10 or FIG. 11. The color film substrate 132 may be provided with touch control signal lines 1322. The second touch electrodes 1320 are electrically connected to the flexible circuit board 1321 through the touch control signal lines 1322. The flexible circuit board 1321 is electrically connected to the driving IC 1312. Therefore, after the touch control signal lines 1322 electrically connected to respective touch electrodes 1320 are aggregated on the color film substrate 132 and electrically connected to the flexible circuit board 1321, the color film substrate 132 is electrically connected to the driving IC 1322 through the flexible circuit board 1321, such that the driving IC 1322 may receive the signal returned from the second touch electrodes 1320.

It can be understood that the display panel 1300 further comprises a backlight unit, a polarizing film, a protective glass, and other structures. In order to avoid unnecessary confusion of the present disclosure, these structures are not shown in FIG. 13.

In the display panel provided in the embodiment of the present disclosure, the driving IC may directly provide a control signal to a driving circuit for driving touch electrodes. Touch scanning of a plurality of touch electrodes may be directly controlled and executed by the IC, i.e., the function of the shift circuit is integrated into the driving IC, thereby simplifying the structure of the display panel and enhancing the flexibility of control.

What have been described above are only preferred embodiments of the present disclosure and illustrations of the employed technical principles. Those skilled in the art should understand that the invention scope related to in the present disclosure is not limited to technical solutions formed by specific combinations of the technical features above, which should also cover other technical solutions formed by any arbitrary combination of the technical features above or their equivalent features without departing from the inventive concept. For example, technical features formed by mutual substitution of the features above with technical features with similar functions disclosed in the present disclosure (but not limited thereto).

What is claimed is:

1. A driving unit for providing a signal to a touch electrode of an array substrate, the driving unit comprising: a first control signal input terminal, a second control signal input terminal, a gating signal input terminal, a touch control driving module, a display driving module, and a signal output terminal; and, wherein the touch control driving module is configured to output a touch control signal to the signal output terminal, and is controlled by a signal inputted through the first control signal input terminal, a signal inputted through the second control signal input terminal, and a signal inputted through the gating signal input terminal; and the display driving module is configured to output a common voltage signal to the signal output terminal, and is controlled by the signal inputted through the gating signal input terminal, wherein the touch control driving module comprises a first NAND gate, a first inverting unit, a first transistor, and a first constant-voltage signal input terminal; and, wherein the first NAND gate comprises a first input terminal, a second input terminal, and a first output terminal, the first input terminal being connected to the first control signal input terminal, the second input terminal being connected to the gating signal input terminal, the first output terminal being connected to an input terminal of the first inverting unit;

a gate of the first transistor is connected to an output terminal of the first inverting unit, a first electrode of the first transistor is connected to the first constant-voltage signal input terminal, and a second electrode of the first transistor is connected to the signal output terminal; and the first inverting unit comprises m cascaded first inverters, where m is a positive integer, wherein the display driving module comprises a fifth transistor, a fifth inverting unit, and a common voltage signal input terminal; and, wherein an input terminal of the fifth inverting unit is connected to the gating signal input terminal, and an output terminal of the fifth inverting unit is connected to a gate of the fifth transistor;

a first electrode of the fifth transistor is connected to the common voltage signal input terminal, and a second electrode of the fifth transistor is connected to the signal output terminal; and the fifth inverting unit comprises p cascaded fifth inverters, where p is a positive integer, wherein when m, p are both odd numbers or m, p are both even numbers, a channel type of the fifth transistor is identical to a channel type of the first transistor; and when one of m, p is an odd number, and the other is an even number, the channel type of the first transistor is different from the channel type of the fifth transistor.

2. The driving unit according to claim 1, wherein the touch control driving module further comprises a second NAND gate, a second inverting unit, a second transistor, and a second constant-voltage signal input terminal; and, wherein the second NAND gate comprises a third input terminal, a fourth input terminal, and a second output terminal, the third input terminal being connected to the second control signal input terminal, the fourth input terminal being connected to the gating signal input terminal, the second output terminal being connected to an input terminal of the second inverting unit;

a gate of the second transistor is connected to an output terminal of the second inverting unit, a first electrode of the second transistor is connected to the second constant-voltage signal input terminal, and a second electrode of the second transistor is connected to the signal output terminal;

the second inverting unit comprises n cascaded second inverters, where n is positive integer; and wherein when m, n are both odd numbers or m, n are both even numbers, a channel type of the first transistor is identical to a channel type of the second transistor; and when one of m, n is an odd number, and the other is an even number, the channel type of the first transistor is different from the channel type of the second transistor.

3. The driving unit according to claim 1, wherein the touch control driving module further comprises a third NAND gate, a third transistor, and a third constant-voltage signal input terminal; and, wherein the third NAND gate comprises a fifth input terminal, a sixth input terminal, and a third output terminal, the fifth input terminal being connected to the second control signal input terminal, the sixth input terminal being connected to the gating signal input terminal, and the third output terminal being connected to a gate of the third transistor; and a first electrode of the third transistor is connected to the third constant-voltage signal input terminal, and a second electrode of the third transistor is connected to the signal output terminal.

4. The driving unit according to claim 1, wherein the driving unit further comprises a fourth inverter, an input terminal of the fourth inverter being connected to the first control signal input terminal, and an output terminal the fourth inverter being connected to the second control signal input terminal.

5. The driving unit according to claim 1, wherein the display driving module comprises a fourth transistor and a common voltage signal input terminal;

a gate of the fourth transistor is connected to the gating signal input terminal, a first electrode of the fourth transistor is connected to the common voltage signal input terminal, and a second electrode of the fourth transistor is connected to the signal output terminal.

6. A driving method for driving a driving unit, the driving unit configured to provide a signal to a touch electrode of an array substrate and comprising: a first control signal input terminal, a second control signal input terminal, a gating signal input terminal, a touch control driving module, a display driving module, and a signal output terminal, the touch control driving module being configured to output a touch control signal to the signal output terminal, controlled by a signal inputted through the first control signal input terminal, a signal inputted through the second control signal input terminal, and a signal inputted through the gating signal input terminal; and the display driving module being configured to output a common voltage signal to the signal output terminal, controlled by the signal inputted through the gating signal input terminal;

wherein the touch control driving module comprises a first NAND gate, a first inverting unit, a first transistor, and a first constant-voltage signal input terminal; and, wherein the first NAND gate comprises a first input terminal, a second input terminal, and a first output terminal, the first input terminal being connected to the first control signal input terminal, the second input terminal being connected to the gating signal input terminal, the first output terminal being connected to an input terminal of the first inverting unit;

a gate of the first transistor is connected to an output terminal of the first inverting unit, a first electrode of the first transistor is connected to the first constant-voltage signal input terminal, and a second electrode of the first transistor is connected to the signal output terminal; and the first inverting unit comprises m cascaded first inverters, where m is a positive integer, wherein the display driving module comprises a fifth transistor, a fifth inverting unit, and a common voltage signal input terminal; and, wherein an input terminal of the fifth inverting unit is connected to the gating signal input terminal, and an output terminal of the fifth inverting unit is connected to a gate of the fifth transistor;

a first electrode of the fifth transistor is connected to the common voltage signal input terminal, and a second electrode of the fifth transistor is connected to the signal output terminal; and the fifth inverting unit comprises p cascaded fifth inverters, where p is a positive integer, wherein when m, p are both odd numbers or m, p are both even numbers, a channel type of the fifth transistor is identical to a channel type of the first transistor; and when one of m, p is an odd number, and the other is an even number, the channel type of the first transistor is different from the channel type of the fifth transistor, wherein the driving method comprises:

during a display phase, providing a first level signal to the first control signal input terminal and the gating signal input terminal, and outputting the common voltage signal by the driving unit;

during a touch detection phase, providing a first pulse signal to the first control signal input terminal, providing a second level signal to the gating signal input terminal, and outputting a periodic touch control signal by the driving unit; and, wherein a voltage value of the first level signal is different from that of the second level signal.

7. The driving method according to claim 6, wherein the method further comprises:

during the display phase, providing the first level signal to the second control signal input terminal; and during the touch detection phase, providing a second pulse signal to the second control signal input terminal; and, wherein a cycle of the second pulse signal is identical to a cycle of the first pulse signal.

8. A driving circuit applied to an array substrate, wherein the array substrate comprises N touch electrodes, where N is a positive integer, the driving circuit comprising N driving units, and a first touch control signal input terminal; and, wherein the driving unit is configured to provide a signal to a touch electrode of an array substrate and comprises: a first control signal input terminal, a second control signal input terminal, a gating signal input terminal, a touch control driving module, a display driving module, and a signal output terminal, the touch control driving module being configured to output a touch control signal to the signal output terminal, controlled by a signal inputted through the first control signal input terminal, a signal inputted through the second control signal input terminal, and a signal inputted through the gating signal input terminal; and the display driving module being configured to output a common voltage signal to the signal output terminal, controlled by the signal inputted through the gating signal input terminal;

wherein the touch control driving module comprises a first NAND gate, a first inverting unit, a first transistor, and a first constant-voltage signal input terminal; and, wherein the first NAND gate comprises a first input terminal, a second input terminal, and a first output terminal, the first input terminal being connected to the first control signal input terminal, the second input terminal being connected to the gating signal input terminal, the first output terminal being connected to an input terminal of the first inverting unit;

a gate of the first transistor is connected to an output terminal of the first inverting unit, a first electrode of the first transistor is connected to the first constant-voltage signal input terminal, and a second electrode of the first transistor is connected to the signal output terminal; and the first inverting unit comprises m cascaded first inverters, where m is a positive integer, wherein the display driving module comprises a fifth transistor, a fifth inverting unit, and a common voltage signal input terminal; and, wherein an input terminal of the fifth inverting unit is connected to the gating signal input terminal, and an output terminal of the fifth inverting unit is connected to a gate of the fifth transistor;

a first electrode of the fifth transistor is connected to the common voltage signal input terminal, and a second electrode of the fifth transistor is connected to the signal output terminal; and the fifth inverting unit comprises p cascaded fifth inverters, where p is a positive integer, wherein when m, p are both odd numbers or m, p are both even numbers, a channel type of the fifth transistor is identical to a channel type of the first transistor; and when one of m, p is an odd number, and the other is an even number, the channel type of the first transistor is different from the channel type of the fifth transistor, the signal output terminals of the driving units are connected to the touch electrodes in one-to-one correspondence; and the first control signal input terminal of each of the driving units is connected to the first touch control signal input terminal.

9. The driving circuit according to claim 8, wherein the driving unit comprises a fourth inverter, an input terminal of the fourth inverter being connected to the first control signal input terminal, and an output terminal of the fourth inverter being connected to the second control signal input terminal.

10. The driving circuit according to claim 8, wherein the driving circuit further comprises a second touch control signal input terminal; and the second control signal input terminal of each of the driving units is connected to the second touch control signal input terminal.

11. A display panel, comprising an array substrate, wherein the array substrate comprises N touch electrodes, a driving IC, and a driving circuit, where N is a positive integer;

wherein the driving circuit is applied to an array substrate comprising N touch electrodes, where N is a positive integer, and the driving circuit comprises N driving units, and a first touch control signal input terminal;

the driving unit is configured to provide a signal to a touch electrode of an array substrate and comprises: a first control signal input terminal, a second control signal input terminal, a gating signal input terminal, a touch control driving module, a display driving module, and a signal output terminal, the touch control driving module being configured to output a touch control signal to the signal output terminal, controlled by a signal inputted through the first control signal input terminal, a signal inputted through the second control signal input terminal, and a signal inputted through the gating signal input terminal; and the display driving module being configured to output a common voltage signal to the signal output terminal, controlled by the signal inputted through the gating signal input terminal;

wherein the touch control driving module comprises a first NAND gate, a first inverting unit, a first transistor, and a first constant-voltage signal input terminal; and, wherein the first NAND gate comprises a first input terminal, a second input terminal, and a first output terminal, the first input terminal being connected to the first control signal input terminal, the second input terminal being connected to the gating signal input terminal, the first output terminal being connected to an input terminal of the first inverting unit;

a gate of the first transistor is connected to an output terminal of the first inverting unit, a first electrode of the first transistor is connected to the first constant-voltage signal input terminal, and a second electrode of the first transistor is connected to the signal output terminal; and the first inverting unit comprises m cascaded first inverters, where m is a positive integer, wherein the display driving module comprises a fifth transistor, a fifth inverting unit, and a common voltage signal input terminal; and, wherein an input terminal of the fifth inverting unit is connected to the gating signal input terminal, and an output terminal of the fifth inverting unit is connected to a gate of the fifth transistor;

a first electrode of the fifth transistor is connected to the common voltage signal input terminal, and a second electrode of the fifth transistor is connected to the signal output terminal; and the fifth inverting unit comprises p cascaded fifth inverters, where p is a positive integer, wherein when m, p are both odd numbers or m, p are both even numbers, a channel type of the fifth transistor is identical to a channel type of the first transistor; and when one of m, p is an odd number, and the other is an even number, the channel type of the first transistor is different from the channel type of the fifth transistor, the signal output terminals of the driving units are connected to the touch electrodes in one-to-one correspondence;

the first control signal input terminal of each of the driving units is connected to the first touch control signal input terminal;

the signal output terminals of respective driving units in the driving circuit are connected to the touch electrodes in one-to-one correspondence;

the driving IC is connected to the driving circuit, and is configured to:

during each display phase, provide a first level signal to the first touch control signal input terminal and the gating signal input terminal; during each touch detecting phase, provide a first pulse signal to the first touch control signal input terminal, and during each touch detecting phase, provide a second level signal to the gating signal input terminal of the driving unit.

12. The display panel according to claim 11, wherein the driving IC is electrically connected to the gating signal input terminal of each of the driving units in the driving circuit.

13. The display panel according to claim 11, wherein the driving IC is further configured to provide a first level signal to the second touch control signal input terminal during each display phase, and provide a second pulse signal to the second touch control signal input terminal during each touch detecting phase; and wherein a cycle of the first pulse signal is identical to a cycle of the second pulse signal.

14. The display panel according to claim 11, wherein the display panel further comprises a color film substrate arranged opposite to the array substrate.

15. The display panel according to claim 14, wherein the touch electrodes are first touch electrodes, the first touch electrodes being strip electrodes;

second touch electrodes are provided on the color film substrate, the second touch electrodes being a strip electrode; and an extending direction of the first touch electrodes is inconsistent with an extending direction of the second touch electrodes.

16. The display panel according to claim 15, wherein the first touch electrodes are provided on one side of the array substrate towards the color film substrate, and the second touch electrodes are provided on one side of the color film substrate distant away from the array substrate.

17. The display panel according to claim 15, wherein data lines and scanning lines are provided on the display panel, and an extending direction of the data lines is perpendicular to an extending direction of the scanning lines; and an extending direction of the first touch electrodes is consistent with the extending direction of the data lines, and an extending direction of the second touch electrodes is consistent with the extending direction of the scanning lines.

* * * * *